Patented July 26, 1927.

1,636,710

UNITED STATES PATENT OFFICE.

WILHELM SIEGEL, OF BERLIN-CHARLOTTENBURG, GERMANY.

MANUFACTURE OF ALKALINE POTASSIUM COMPOUNDS.

No Drawing. Application filed October 21, 1925, Serial No. 63,918, and in Germany July 12, 1924.

This invention refers broadly to the manufacture of potassium compounds of alkaline reaction, and in particular of potassium hydroxide, potassium carbonate, and potassium-bicarbonate, and it is based upon the well known fact that the hydroxides and carbonates of the alkali metals may be obtained from alkali-metal-fluorides and silico-alkali-metal-fluorides by direct decomposition with calcium-hydroxide or with the similarly acting calcium carbonate, and it is intended to improve the course of manufacture to increase the yield of salable products and the quality of the same, and to produce other important advantages that will appear as the specification proceeds. The process of decomposition of the fluorides referred to, when being carried out in accordance with the previous art, did not admit of an extensive utilization for practical purposes, chiefly on account of the fact that the fluorides of the alkaline earths were precipitated in a slimy condition, so that the progress of the reaction was arrested by the fact that the reacting substances were enveloped by the slimy material, and a quantitative conversion could either not be obtained at all or only with very high degrees of dilution, and the fluorides precipitated in this manner can only be washed out very difficultly. By this means the yield is further decreased, while the concentration is further reduced by the washing liquors.

Now, in the course of my researches I have ascertained that potassium-silico-fluoride may be treated with an alkaline potassium compound, such as potassium hydroxide or potassium carbonate or potassium-bicarbonate with the result that the silicic acid produced by the reaction may be obtained in a condition which admits of the potassium-fluoride being easily washed out. The silica thus produced does not possess the very annoying slimy property which it will for instance possess, if calcium oxide is caused to act directly upon potassium-silicofluoride. The reaction described proceeds in accordance with the following equation:—

I. 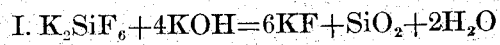

$$K_2SiF_6 + 4KOH = 6KF + SiO_2 + 2H_2O$$

The reaction product consisting of silicic acid and a solution of potassium-fluoride is now treated with inorganic compounds of the metals of the second group of the periodic system with an atomic weight of from 24 to 41, or, in other words, with alkaline compounds of the alkali-earth-metals, and adapted to become decomposed by weak acids. The term "alkali-earth-metals" should be understood to include magnesium as well as calcium, and the alkaline compounds of these alkali-earth-metals include particularly the oxides, hydroxides and carbonates of calcium and magnesium, which may be utilized in the shape of quick lime, unburnt lime, slaked lime, oxide of magnesium, magnesium-hydroxide, carbonate of magnesium, dolomite (that is to say, a mixture of calcium-carbonate with carbonate of magnesium), all of which being either in the burnt or unburnt or slaked condition. In the case of employing slaked lime the reaction takes place in accordance with the following equation:—

II. 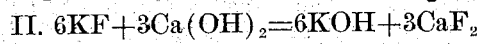

$$6KF + 3Ca(OH)_2 = 6KOH + 3CaF_2$$

so that in this case potassium hydroxide and calcium-fluoride are obtained. The potassium hydroxide existing in the solution may be separated in the well known manner from the insoluble calcium-fluoride and from the insoluble silicic acid and in view of the absence of any slimy condition of the silicic acid the washing out can be easily and thoroughly effected.

As appears from the Equation II there have been obtained 6 molecules of potassium-hydroxide while according to Equation I 4 molecules of this compound have been used, so that an excess of 2 molecules has been gained, that is to say, the contents of potassium in the silico-potassium-fluoride have become converted into caustic potash. These 2 molecules may be withdrawn from the process as a marketable product, while the remaining 4 molecules re-enter the process, as will be more fully described hereinafter.

The calcium-fluoride formed (Equation II) is now treated in the presence of silicic acid (Equation I) with a mineral acid, such as for instance hydrochloric acid, sulphuric acid, sulphurous acid and the like, resulting in the formation of silico-hydrofluoric acid and of the salts of the particular acid added with the alkaline earth metal. The following equation shows the reaction, when sulphuric acid is used:—

III. $3CaF_2 + SiO_2 + 3H_2SO_4 = 3CaSO_4 + H_2SiF_6 + 2H_2O$.

This silico-hydrofluoric acid may now be caused to act upon a potassium salt with a view of re-forming silico-potassium-fluoride, and to re-introduce the same again into the cycle of operations in accordance with Equation I. Of such potassium salts I may particularly utilize the cheap, and more or less impure potassium salts of commerce, thus for example, potassium-chloride in the shape of sylvine, carnallite or the like. In the following Equation IV only the formula of the pure salt KCl has been indicated:—

IV. $H_2SiF_6 + 2KCl = K_2SiF_6 + 2HCl$.

The cycle of operations is continued by decomposing the potassium-silico-fluoride formed with the 4 molecules of potassium-hydroxide which have been produced aside of the excess of KOH in accordance with the equation II.

In a modified form of execution of the process the silicic acid may be separated out according to Equation I, so that the reaction according to Equation II is carried on between the alkali-earth compound and the potassium fluoride and in the absence of silicic acid. By this means a particularly pure potassium hydroxide is obtained, or any of the other potassium compounds of alkaline reaction free from silicates and silicic acid. The silicic acid removed is then again introduced into the reaction according to Equation III.

If desired, the process may be broken off at the stage of the Equation II, which is to say that silico-potassium-fluoride may be treated with a potassium compound of alkaline reaction in accordance with Equation I and to the reaction product the compound of the alkaline earth metal for instance calcium-hydroxide may be added. The alkaline potassium compound produced, caustic potash for instance, and the calcium-fluoride formed and the liberated silicic acid may be separated from each other and the calcium-fluoride may be further treated in any suitable manner, thus, for instance, for the production of other fluorine compounds.

It is of importance for the procedure according to this invention to operate with potassium compounds in the decomposition of the potassium silico-fluoride in accordance with Equation I. If attempts would be made to perform the decomposition by means of a sodium compound, with caustic soda for instance, the silica will be obtained in such a slimy state that a separation of the other reaction products will meet with the greatest difficulties.

*Examples.*

1. 100 kilogrs. potassium silico-fluoride are stirred up with 610 liters potassium hydroxide liquor of specific gravity 1.125 and heated. As soon as a sample of the mixture taken out during the reaction shows that the decomposition is terminated, the separated silicic acid is filtered and washed out. Thus, about 740 liters of a solution are obtained containing 155 kilogrs. potassium-fluoride. This solution is heated and is treated with 103 kilogrs. calcium-hydroxide with agitation. The calcium-fluoride formed thereby is separated and washed out. About 900 liters of a solution are thereby obtained which contains 147 kilogrs. potassium-hydroxide. Of this solution 300 liters are withdrawn from the process and may be utilized directly as a marketable product or after having been further concentrated. The remaining 600 liters are returned to the process and are used for the decomposition of new quantities of potassium silico-fluoride. Calcium-fluoride and silica which were previously separated out are united and are heated in a closed container with stirring means and with 460 liters sulphuric acid of 1.185 specific gravity. A solution of silico-hydrofluoric acid is thereby obtained which is separated from the precipitated calcium-sulphate and is combined with a salt solution containing 65 kilogrs. potassium-chloride in 225 liters. This will cause the separation of 95 kilogrs. silico-potassium-fluoride, which are removed and may be returned into the process for renewed decomposition.

2. 100 kilogrs. silico-potassium-fluoride are heated with 800 liters of a solution containing 130 kilogrs. potash, giving rise to the evolution of carbonic acid. If, after several hours, a sample taken out from the mass, shows the termination of the reaction, the separated silicic acid is filtered and washed out. The solution obtained by separation contains 155 kilogrs. potassium-fluoride and is mixed and agitated with 140 kilogrs. finely ground chalk. Calcium-fluoride is thereby deposited which is separated and washed out. After having been dried 105 kilogrs. calcium-fluoride are obtained which may be withdrawn as a marketable product from the process. If it is desired to obtain therefrom hydrofluoric acid by decomposition with sulphuric acid, there is no necessity of previous drying. The solution separated therefrom contains 186 kilogrs. potash in 1300 liters of liquid and may be further treated for the production of solid potash in the usual manner by evaporation and calcination.

3. 100 kilogrs. silico-potassium-fluoride are stirred up with 610 kilogrs. caustic potash of 1.125 specific gravity. After the decomposition has been terminated, 70 kilogrs. burned dolomite are added with constant stirring. The deposited mixture of silica, calcium-fluoride and magnesium-flouride is separated from the caustic potash formed and is stirred up with 600 kilogrs. of hydrochloric acid of 15%. A solution is obtained containing free silico-hydrofluoric acid and its calcium salt and magnesium salt, and chloride of calcium and chloride of magnesium and free hydrochloric acid. From this solution 95 kilogrs. silico-potassium-fluoride are recovered by the addition of 65 kilogrs. potassium-chloride either as a solid salt or as a solution. The caustic potash liquor which has been separated out as above described and containing 147 kilogrs. KOH in 1000 liters of liquid may be further utilized and treated in accordance with Examples 1 or 2.

What I claim is:—

1. The process of producing potassium compounds from silico-potassium-fluoride, which consists in treating the same with alkaline potassium compounds, thereby producing silica and potassium-fluoride and treating the fluoride with alkaline compounds of the alkali-earth metals.

2. The process of producing potassium compounds which consists in treating silico-potassium-fluoride with alkaline potassium compounds, thereby producing silica and potassium-fluoride, treating the fluoride with alkaline compounds of the alkali-earth-metals, separating the potassium-compound produced from the fluoride of said alkali-earth-metals and from the said silica and converting said fluoride into silico-potassium-fluoride.

3. The process of producing potassium compounds which consists in treating silico-potassium-fluoride with alkaline potassium compounds, thereby producing silica and potassium-fluoride, treating the fluoride with alkaline compounds of the alkali-earth-metals, treating the fluoride produced of said alkali-earth-metals with silica and a mineral acid, thereby producing silico-hydrofluoric acid and treating said latter acid with a potassium salt and separating the silico-potassium-fluoride produced.

4. The process of producing potassium compounds which consists in treating silico-potassium-fluoride with alkaline potassium compounds, thereby producing silica and potassium fluoride, adding alkaline compounds of the alkali-earth-metals, separating the soluble alkaline potassium compound and treating the residue with a mineral acid and with a soluble potassium salt and thereby recovering silico-potassium-fluoride.

5. The process of producing potassium compounds which consists in treating silico-potassium-fluoride with a soluble alkaline potassium compound and with alkaline compounds of alkali-earth-metals and separating the fluoride of these metals and the silica thereby produced from the soluble alkaline potassium compound.

6. The process of producing potassium compounds which consists in treating silico-potassium-fluoride with a soluble alkaline potassium compound and calcium-carbonate and separating the silica and the calcium-fluoride produced from the soluble alkaline potassium compound obtained.

7. The process of producing potassium compounds which consists in treating silico-potassium-fluoride with a soluble alkaline potassium compound and burnt lime and separating the silica and the calcium-fluoride produced from the soluble alkaline potassium compound obtained.

8. The process of producing potassium compounds which consists in treating silico-potassium-fluoride with alkaline potassium compounds and with calcium-carbonate, separating the soluble alkaline potassium compound obtained from the residue and treating said residue with a mineral acid and with a soluble potassium salt and thereby recovering silico-potassium-fluoride and separating the same from the acid liquor.

9. The process of producing potassium compounds which consists in treating silico-potassium-fluoride with alkaline potassium compounds and with calcium-carbonate, separating the soluble alkaline potassium compound obtained from the residue and treating said residue with a mineral acid, separating the silico-hydrofluoric acid obtained and converting the same into silico-potassium-fluoride.

10. The process of producing potassium compounds which consists in treating silico-potassium-fluoride with soluble alkaline potassium compounds, thereby producing silica and potassium-fluoride, treating the fluoride with calcium-carbonate, separating the calcium-fluoride produced from the alkaline potassium compound obtained and decomposing the calcium-fluoride in the presence of silica with a mineral acid and finally with a potassium salt and recovering the silico-potassium-fluoride.

11. The process of producing potassium compounds which consists in treating silico-potassium-fluoride with alkaline potassium compounds and with calcium-carbonate, separating the soluble alkaline potassium compound produced from the residue of calcium-fluoride and silica and treating said residue with sulphuric acid and with a soluble potassium salt and separating the silico-potassium-fluoride.

12. The process of producing potassium compounds which consists in treating silico-potassium-fluoride with alkaline potassium compounds and with calcium-carbonate, separating the soluble alkaline potassium compound produced from the residue of calcium-fluoride and silica, treating said residue with sulphuric acid, separating the silico-hydrofluoric acid produced from the sulphate of lime and treating the silico-hydrofluoric acid with a potassium salt and recovering the silico-potassium-fluoride produced.

In testimony whereof I have affixed my signature.

WILHELM SIEGEL.